F. A. KAEDING.
AIR CHECK VALVE.
APPLICATION FILED DEC. 1, 1917.
1,281,974. Patented Oct. 15, 1918.
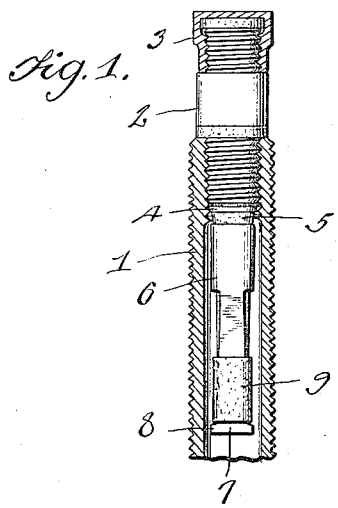
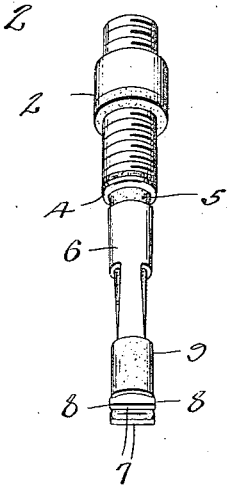
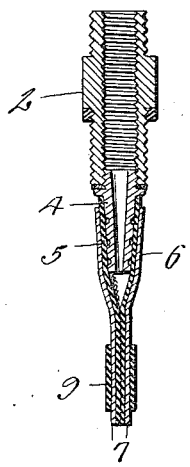
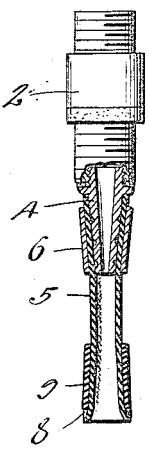
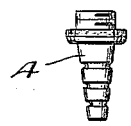
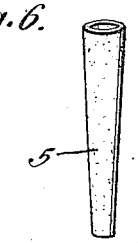
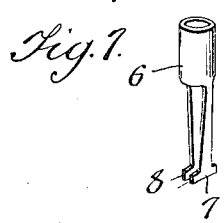
Inventor
F. A. Kaeding,
By Victor J. Evans
Attorney
Witnesses

UNITED STATES PATENT OFFICE.

FRED A. KAEDING, OF SOMERS, MONTANA.

AIR-CHECK VALVE.

1,281,974. Specification of Letters Patent. Patented Oct. 15, 1918.

Application filed December 1, 1917. Serial No. 204,903.

*To all whom it may concern:*

Be it known that I, FRED A. KAEDING, a citizen of the United States, residing at Somers, in the county of Flathead and State of Montana, have invented new and useful Improvements in Air-Check Valves, of which the following is a specification.

This invention has reference to pneumatic valves and is primarily adapted to that class of such valves which are applied to pneumatic tires for motor vehicles, or the like.

In carrying out my invention it is my purpose to produce a cheap and durable valve which shall combine in the maximum degree of simplicity, capacity and efficiency, both in admitting and retaining air under pressure.

Other objects and advantages will appear as the nature of the construction is better understood, reference being had to the accompanying drawing, in which, Figure 1 is a longitudinal sectional view through an ordinary valve casing having my improvement applied thereto, the improvement being in elevation.

Fig. 2 is a perspective view of the elements constituting the valve removed from the casing, looking toward the inner end of the valve.

Fig. 3 is an approximately central longitudinal sectional view through the same.

Fig. 4 is a similar section, but taken at a right angle to that disclosed in Fig. 3.

Fig. 5 is a side elevation of the nipple employed.

Fig. 6 is a similar view of the elastic tube, comprising the valve proper.

Fig. 7 is a perspective view of the sleeve member having the jaws integrally formed therewith to engage with the opposite sides of the elastic tube.

Fig. 8 is a perspective view of the tube compressor band.

My improved valve may be employed in connection with an ordinary valve casing as an emergency valve therefor, upon the removal of the ordinary valve employed in such casing, or, if desired, the same may constitute the permanent valve.

Referring now to the drawings in detail, the numeral 1 designates an ordinary valve casing for pneumatic tires, the same having its outer end provided with the usual internal threads, and engaging with the said threads is the inner threaded member of a plug 2, the outer threaded end of the plug being normally closed by the usual cap 3. The inner end of the plug is threadedly engaged by a nipple 4 that preferably is provided with continuous ribs and depressions. The nipple is designed to receive the wider end of an elastic tube 5. The tube 5 may be constructed of rubber, leather, or any other desired material of sufficient strength and elasticity, and comprises a member of a hollow substantially frusto-conical formation, the wider end, as stated, being received on the nipple, and this wider end is retained in frictional engagement with the ribs and grooves of the nipple 4 through the medium of a sleeve 6. This sleeve is preferably constructed of metal and is passed over the tube from the narrow or outer end thereof, and as stated, compresses said tube against the nipple to associate the said tube with the nipple and plug. The sleeve, upon its outer end, is provided with oppositely disposed flat jaws 7, the said jaws being gradually increased in width from their connection with the sleeve to the outer ends of the said jaws, and the said outer ends at the corners thereof, are preferably formed with extending lugs 8. The jaws 7 are inclined toward each other from their connection with the sleeve 6 and, being constructed of metal, exert a pressure toward each other. The jaws contacting with the opposite sides of the reduced end of the tube 5 will force the said sides toward each other and close this end of the tube. The extensions or lugs on the outer corners of the jaws materially add to the width of the said jaws so that the flattened tube will be contacted for the entire width thereof, by the said jaws, or rather the widened ends of the jaws. To aid the jaws in such action, I provide a compressing element, which, as shown in the drawings, is in the nature of an elastic band 9, the said band being stretched around the jaws 7 and contacting with the lugs 8 on the outer ends of the said jaws is held in such position. The band forces the flat jaws into tight contact with the outer end of the tube 5, so that the said tube, at the said end thereof, is flattened and the bore is thus sealed. A pressure of air, from a suitable pump through the plug 2 will effect a bulging of the compressed end of the tube outwardly, spreading the jaws 7 against the elastic pressure from the band 9, and permitting a free flow of air through the casing 1 into the pneumatic tire. When such pressure is relieved, the tube is again compressed by the jaws 7 and by the band 9, so that the outflow of air through the casing will be effectively prevented. In instances when it is desirable to reduce the air pressure in the tire, the cap 3 is removed, and a suitable, preferably pointed, instrument is inserted through the plug to open the reduced end of the tube 5. The withdrawal of this instrument will, of course, permit the spring jaws and the band 9 again closing the end of the tube. A valve constructed as above described is positively air tight. The parts constituting the same are of a simple nature and can be cheaply manufactured and marketed, the said parts being interchangeable so that should wear or breakage occur to one of the parts, the same may be replaced by a new part without necessitating the purchase of an entirely new valve, and from the foregoing description, when taken in connection with the accompanying drawing, the simplicity and advantages of the construction will, it is thought, be apparent without further detailed description.

Having thus described the invention, what I claim is:

1. In combination with a valve casing, a plug in the outer end thereof and a nipple on one end of said plug, of an elastic tube connected with the nipple, a metallic sleeve on said tube compressing the same against the nipple, and integrally formed spring jaws on said sleeve contacting with the opposite sides of said tube to compress the same and close the passage therein.

2. In combination with a valve casing, a plug in the outer end thereof and a nipple on said plug, of an elastic tube connected with the nipple, a metallic sleeve on said tube compressing the same against the nipple, oppositely disposed angularly arranged spring jaws on said sleeve contacting with the tube to compress the same and close the passage therein, and an elastic compressor surrounding said jaws.

3. In combination with a valve casing, a plug in the outer end thereof and a nipple on said plug, of an elastic tube connected with the nipple, a metallic sleeve on said tube compressing the same against the nipple, oppositely disposed inwardly inclined spring jaws on said sleeve contacting with the tube to compress the same and close the passage therein, and means, associated with said jaws, for compressing the same against the tube.

4. In combination with a valve casing, a plug in the outer end thereof, and a nipple on said plug, of an elastic tube connected with the nipple, a metallic sleeve on said tube compressing the same against the nipple, integrally formed oppositely arranged inwardly inclined spring jaws on said sleeve contacting with the tube to compress the same and close the passage therein, outward extensions on the ends of said jaws, and a removable element surrounding said jaws and exerting a pressure thereagainst to force the referred to extensions on the ends of said jaws into tight engagement with the tube.

In testimony whereof I affix my signature.

FRED A. KAEDING.